United States Patent
Holwerda et al.

(10) Patent No.: US 12,514,397 B2
(45) Date of Patent: Jan. 6, 2026

(54) DISCHARGE OF RINSING WATER FROM A BREW CHAMBER OF A BEVERAGE MAKING DEVICE

(71) Applicant: VERSUNI HOLDING B.V., Eindhoven (NL)

(72) Inventors: Simon Renze Holwerda, Eindhoven (NL); Anke Gerda Sinnema, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/721,166

(22) PCT Filed: Nov. 17, 2022

(86) PCT No.: PCT/EP2022/082354
§ 371 (c)(1),
(2) Date: Jun. 17, 2024

(87) PCT Pub. No.: WO2023/110283
PCT Pub. Date: Jun. 22, 2023

(65) Prior Publication Data
US 2024/0415322 A1    Dec. 19, 2024

(30) Foreign Application Priority Data

Dec. 15, 2021   (EP) .................................... 21214735

(51) Int. Cl.
*A47J 31/60* (2006.01)
*A47J 31/24* (2006.01)
(Continued)

(52) U.S. Cl.
CPC ............... *A47J 31/60* (2013.01); *A47J 31/24* (2013.01); *A47J 31/42* (2013.01); *A47J 31/469* (2018.08);
(Continued)

(58) Field of Classification Search
CPC .......... A47J 31/60; A47J 31/469; A47J 31/24; A47J 31/42; A47J 31/52; A47J 31/54; B08B 9/0821; B08B 2209/08
See application file for complete search history.

(56) References Cited

U.S. PATENT DOCUMENTS 4,098,175 A   7/1978  Fierz
5,230,278 A   7/1993  Bunn et al.

FOREIGN PATENT DOCUMENTS

CN   113453597 A   9/2021
CN   117136024 A   11/2023
(Continued)

OTHER PUBLICATIONS

Machine Translation of DE102019206635A1 (Year: 2020).*
(Continued)

*Primary Examiner* — Sharidan Carrillo
(74) *Attorney, Agent, or Firm* — Maschoff Brennan

(57) ABSTRACT

The invention discloses a beverage making device that includes a brew chamber that enables a beverage brewing process. The brew chamber has a beverage outlet that lets out a brewed beverage at the end of the beverage brewing process. A rinsing procedure is performed in which the brew chamber is rinsed with water prior to or after the beverage brewing process. During the rinsing procedure, a discharge of rinsing water from the brew chamber takes place at another position on the brew chamber than a position of a beverage outlet. The other position on the brew chamber than the position of the beverage outlet is an upstream position on the brew chamber as seen in a direction of water and brewed beverage through the beverage making device associated with the beverage brewing process. The rinsing water is discharged based on a control of operation of the beverage making device.

10 Claims, 2 Drawing Sheets

(51) Int. Cl.
   *A47J 31/42*   (2006.01)
   *A47J 31/46*   (2006.01)
   *A47J 31/52*   (2006.01)
   *A47J 31/54*   (2006.01)
   *B08B 9/08*    (2006.01)

(52) U.S. Cl.
   CPC .............. *A47J 31/52* (2013.01); *A47J 31/54* (2013.01); *B08B 9/0821* (2013.01); *B08B 2209/08* (2013.01)

(56) References Cited

FOREIGN PATENT DOCUMENTS

| | | |
|---|---|---|
| DE | 4010462 A1 | 8/1991 |
| DE | 202012010101 U1 * | 1/2013 |
| DE | 102019206635 A1 * | 11/2020 |
| DE | 102020202043 A1 * | 8/2021 |
| WO | 2020126876 A1 | 6/2020 |
| WO | 2022/218759 A1 | 10/2022 |

OTHER PUBLICATIONS

Machine Translation of DE102020202043A1 (Year: 2021).*
Machine Translation of DE202012010101U1 (Year: 2013).*
Extended European Search Report issued in connection with corresponding EP Application No. 21214735.9 dated Jun. 27, 2022.

* cited by examiner

DISCHARGE OF RINSING WATER FROM A BREW CHAMBER OF A BEVERAGE MAKING DEVICE

CROSS-REFERENCE TO RELATED APPLICATIONS

The present application is a U.S. National Phase application under 35 U.S.C. § 371 of International Application No. PCT/EP2022/082354, filed on Nov. 17, 2022, which claims the benefit of European Patent Application No. 21214735.9, filed on Dec. 15, 2021. These application is hereby incorporated by reference herein.

FIELD OF THE INVENTION

The invention relates to a method of operating a beverage making device comprising a brew chamber configured to enable a beverage brewing process, wherein the brew chamber has a beverage outlet configured to let out a brewed beverage at the end of the beverage brewing process, wherein the method comprises performing a rinsing procedure in which the brew chamber is rinsed with water prior to or after the beverage brewing process, and wherein, during the rinsing procedure, a supply of rinsing water to the brew chamber is realized and at a later stage a discharge of rinsing water from the brew chamber is realized.

Further, the invention relates to a beverage making device, comprising a brew chamber configured to enable a beverage brewing process, wherein the brew chamber has a beverage outlet configured to let out a brewed beverage at the end of the beverage brewing process, and a controller configured to control operation of the beverage making device, wherein the controller is configured to apply an algorithm designed to make the beverage making device perform a rinsing procedure in which the brew chamber is rinsed with water prior to or after the beverage brewing process, and wherein the algorithm includes steps to realize a supply of rinsing water to the brew chamber and to realize at a later stage a discharge of rinsing water from the brew chamber. For example, such a beverage making device may be a bean-to-cup espresso coffee machine comprising a bean grinder and a ground bean compressor.

BACKGROUND OF THE INVENTION

WO 2020/126876 A1 discloses a bean-to-cup espresso coffee machine, which is a machine configured to perform both a function of grinding of coffee beans and a function of brewing espresso coffee by passing pressurized hot water through the coffee grinds to create an espresso coffee drink. The known coffee machine comprises a water container, a heater for heating water to generate hot water and optionally steam, and a water pump for pumping the heated water and steam. During a coffee brewing process, a brew chamber is filled with a suitable amount of coffee grinds. Further, both the heater and the water pump are operated, wherein the heated water is pumped from the heater to the brew chamber through a valve.

Advantageously, the coffee brewing process is preceded by a start-up rinsing cycle aimed at preheating the brew chamber. During the start-up rinsing cycle, the brew chamber is rinsed with water heated by the heater. Under the influence of the hot water, the brew chamber walls are heated, as a result of which a temperature of the coffee to be brewed in the brew chamber and dispensed from the brew chamber can be realized as desired, wherein the coffee is particularly prevented from getting too cold. The coffee machine may further be capable of performing a shut-off rinse for cleaning the brew chamber.

The water used in a rinsing procedure is provided to a drip tray that is present in the coffee machine for the purpose of receiving and collecting waste water, i.e. water that does not end up in a drink. For the purpose of letting out water and drinks, the brew chamber has an outlet in fluid communication with a coffee output of the coffee machine that faces downwardly and is located over the drip tray. A notable disadvantage of having the rinsing procedures in the known coffee machine is that it is not possible to place a receptacle at the coffee machine in advance and to use a timer for operating the coffee machine, for example, as in such a case, the rinsing water of the start-up rinsing cycle would be emitted to the receptacle and would mix with the drink.

DE 10 2019 206 635 A1 discloses a coffee machine that is configured to avoid mixing of rinsing water and drinks. To that end, the coffee machine comprises a switching valve that is arranged downstream of the outlet of the brew chamber and that is configured to switch between a position of being open to a discharge line leading to an area of the coffee machine where a receptacle is to be received and a position of being open to a discharge line leading directly to the drip tray and bypassing the area as mentioned.

SUMMARY OF THE INVENTION

It is an object of the invention to provide a way of realizing a rinsing procedure in a beverage making device such as the one known from WO 2020/126876 A1 that provides for more flexible use of the beverage making machine without a risk of drinks dispensed from the beverage making device being mixed with rinsing water, and to do so without needing to take costly measures, particularly without needing to add components to the beverage making device. Hence, it is an object of the invention to provide another way of alleviating the disadvantageous influence of the rinsing functionality of the beverage making device on the quality of the drinks and/or the range of possibilities of use of the beverage making device and/or the complexity of use of the beverage making device in another way than known from DE 10 2019 206 635 A1, which involves the addition of a switching valve, as explained in the foregoing.

In view of the foregoing, the invention provides a method of operating a beverage making device comprising a brew chamber configured to enable a beverage brewing process, wherein the brew chamber has a beverage outlet configured to let out a brewed beverage at the end of the beverage brewing process, wherein the method comprises performing a rinsing procedure in which the brew chamber is rinsed with water prior to or after the beverage brewing process, and wherein, during the rinsing procedure, a supply of rinsing water to the brew chamber is realized and at a later stage a discharge of rinsing water from the brew chamber is realized at another position on the brew chamber than the position of the beverage outlet, which other position on the brew chamber than the position of the beverage outlet is an upstream position on the brew chamber as seen in a direction of water and brewed beverage through the beverage making device associated with the beverage brewing process.

Similarly, the invention provides a beverage making device, comprising a brew chamber configured to enable a beverage brewing process, wherein the brew chamber has a beverage outlet configured to let out a brewed beverage at the end of the beverage brewing process, and a controller configured to control operation of the beverage making device, wherein the controller is configured to apply an algorithm designed to make the beverage making device perform a rinsing procedure in which the brew chamber is rinsed with water prior to or after the beverage brewing process, and wherein the algorithm includes steps to realize a supply of rinsing water to the brew chamber and to realize at a later stage a discharge of rinsing water from the brew chamber at another position on the brew chamber than the position of the beverage outlet, which other position on the brew chamber than the position of the beverage outlet is an upstream position on the brew chamber as seen in a direction of water and brewed beverage through the beverage making device.

It follows from the foregoing definition of the method and the beverage making device according to the invention that the invention resides in realizing a discharge of rinsing water from the brew chamber at another position on the brew chamber than the position of the beverage outlet. In this way, it is achieved that the rinsing water can be made to follow another line than the one followed by a brewed beverage out of the brew chamber. Various practical embodiments are feasible in which this advantageous effect can be realized without needing to use one or more additional valves or the like, as will become apparent from the following.

According to the invention, the position on the brew chamber at which rinsing water is discharged from the brew chamber at the later stage of the rinsing procedure is an upstream position on the brew chamber as seen in a direction of water and brewed beverage through the beverage making device associated with the beverage brewing process. For example, assuming that the brew chamber has a water inlet configured to receive water and let in water to an interior of the brew chamber, it may be practical if the position on the brew chamber at which rinsing water is discharged from the brew chamber at the later stage of the rinsing procedure is a position of the water inlet on the brew chamber. In that way, it is not necessary to design the brew chamber with an additional outlet, and use may be made of existing structures and functionalities of the beverage making device, wherein it is sufficient if changes relative to the conventional situation only involve adaptation of the way in which operation of the beverage making device is controlled.

In a practical embodiment, the beverage making device according to the invention further comprises a pumping arrangement configured to subject water in the beverage making device to a pumping action towards the brew chamber and to increase fluid pressure in the brew chamber, and also comprises a normally-closed outlet valve at the position of the beverage outlet of the brew chamber, as known per se. During the beverage brewing process, pressure builds up in the brew chamber under the influence of the pumping action until a pressure level is reached at which the outlet valve opens so that the brewed beverage is discharged from the brew chamber through the beverage outlet. In order to avoid discharge of rinsing water from the brew chamber through the beverage outlet during the rinsing procedure, it is practical if measures are taken to ensure that throughout the rinsing procedure, fluid pressure in the brew chamber is below the pressure level at which the outlet valve opens.

In the practical case that the beverage making device according to the invention further comprises a water collecting area outside of the brew chamber, it may particularly be so that the position on the brew chamber at which rinsing water is discharged from the brew chamber at the later stage of the rinsing procedure is a position from which the rinsing water is allowed to reach the water collecting area. In general, the water collecting area may be an area that is arranged and configured to receive all of the waste water from the beverage making device, i.e. all of the water that does not end up in the beverages which are made by means of the beverage making device. It is known in the art that such a water collecting area may be present in the form of a component that is commonly referred to as drip tray and that is arranged at a position underneath a spout configured to emit the beverage, i.e. to release the beverage to outside the beverage making device so that it can be collected in a receptacle such as a cup.

Like known beverage making devices, the beverage making device may further comprise a heater configured to heat water, and a main conduit arrangement configured to enable transport of water from the heater to the brew chamber. In such a context, it is possible that the brew chamber is couplable to and decouplable from the main conduit arrangement. If that is the case, indeed, realizing the discharge of rinsing water from another position on the brew chamber than the position of the beverage outlet can be done by having the brew chamber at a position of being decoupled from the main conduit arrangement. In particular, it may be so that during the rinsing procedure, the following actions are performed: coupling the brew chamber to the main conduit arrangement for receiving the supply of rinsing water from the main conduit arrangement and at the later stage decoupling the brew chamber from the main conduit arrangement for discharging the rinsing water.

As explained earlier, a rinsing procedure that is performed when the beverage making device is switched on some time after a previous use, i.e. a start-up rinsing procedure, preferably also serves to preheat the brew chamber. Thus, such a rinsing procedure normally involves operating the heater to heat water. A rinsing procedure that is performed as part of a shut-off procedure of the device does not necessarily need to involve the use of hot rinsing water and may be performed by means of cold rinsing water instead, although rinsing with hot water may be the most effective. In any case, this implies that assuming that the beverage making device further comprises the heater and the main conduit arrangement, and that the brew chamber is couplable to and decouplable from the main conduit arrangement, the invention also covers an option of the rinsing procedure involving an action of operating the heater. Generally speaking, it is possible to perform one rinsing procedure after another if appropriate for thorough cleaning and/or other reasons, and the algorithm applied by the controller of the beverage making device may be designed to repeat the rinsing procedure.

Advantageously, the known option of the brew chamber being movably arranged in the beverage making device is applied in the context of the invention. The fact is that when the brew chamber is movably arranged in the beverage making device, this offers a practical possibility of varying the position of the brew chamber between the position at which the brew chamber is coupled to the main conduit arrangement and the position at which the brew chamber is decoupled from the main conduit arrangement. Thus, it may be so that putting the invention to practice involves changing a position of the brew chamber from a position at which the brew chamber is coupled to the main conduit arrangement to a position at which the brew chamber is decoupled from the main conduit arrangement during the rinsing procedure, wherein the discharge of the rinsing water from the brew chamber at the other position on the brew chamber than the position of the beverage outlet can take place as soon as the brew chamber is moved from the first position to the latter.

In a practical embodiment, the beverage making device further comprises a matter supply area configured to supply brewable matter such as coffee grinds, wherein the position at which the brew chamber is decoupled from the main conduit arrangement is a position at which coupling of the brew chamber to the matter supply area takes place and at which a supply of the brewable matter to the brew chamber is enabled at the start of the beverage brewing process. For the purpose of putting the invention to practice, it is not necessary to define other positions of the brew chamber besides the positions which are already defined in view of the beverage brewing process.

The invention covers an advantageous option according to which, during the rinsing procedure as performed prior to the beverage brewing process, a start-up action of discharging water from the main conduit arrangement without supplying the water to the brew chamber is performed prior to the action of realizing the supply of rinsing water to the brew chamber. The fact is that in this way, an initial cooling effect on the brew chamber that might otherwise occur under the influence of an amount of cold water as may be present in the main conduit arrangement before hot water is made to flow to the main conduit arrangement, can be avoided. Also the start-up action as mentioned may be performed by decoupling the brew chamber from the main conduit, for example, such as by moving the brew chamber from one position to another as explained in the foregoing. Thus, the known option of the brew chamber being movably arranged in the beverage making device cannot only be used to advantage for the purpose of discharging rinsing water from the brew chamber at another position than the position of the beverage outlet, but also for the purpose of discharging cold water from the main conduit arrangement prior to a preheating rinsing procedure.

In view of the option of the above-described start-up action, it may be practical if the beverage making device comprises a check valve arranged in the main conduit arrangement, an inlet of the check valve being coupled to the heater and an outlet extending above a water collecting area, and further comprises an intermediate valve coupled to the brew chamber that is configured to cause interruption of a water path from the outlet of the check valve to the water collecting area and establishment of a water path from the outlet of the check valve to the brew chamber when the brew chamber is moved from the position of being decoupled from the main conduit arrangement to the position of being coupled to the main conduit arrangement. In that way, first setting a water path so as to be from the outlet of the check valve to the water collecting area so that water can be discharged from a portion of the main conduit arrangement between the heater and the check valve and subsequently setting the water path so as to be from the outlet of the check valve to the brew chamber so that water can be transported from the heater to the brew chamber can simply be done by first having the brew chamber at the position of being decoupled from the main conduit arrangement and putting the brew chamber from that position to the position of being coupled to the main conduit arrangement at an appropriate moment, i.e. after a discharge of cold water from the main conduit arrangement downstream of the heater.

The above-described and other aspects of the invention will be apparent from and elucidated with reference to the following detailed description of a practical embodiment of a bean-to-cup espresso coffee machine that is not only controllable to perform a beverage brewing process, but also a rinsing procedure in which a brew chamber of the coffee machine is rinsed with water.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

The following detailed description of specific examples covered by the invention is intended for purposes of illustration only and not to limit the scope of protection as defined in the claims. Generally speaking, the invention is in the field of beverage making devices comprising a brew chamber, and relates to a rinsing procedure as may be applied to a beverage making device for the purpose of rinsing the brew chamber with water prior to or after a beverage brewing process. The invention provides another way out of the brew chamber for the rinsing water than through a beverage outlet of the brew chamber, which involves a number of advantages such as an increased number of possibilities of use of beverage making devices, while a risk that rinsing water mixes with brewed beverages is avoided.

Figure 1:
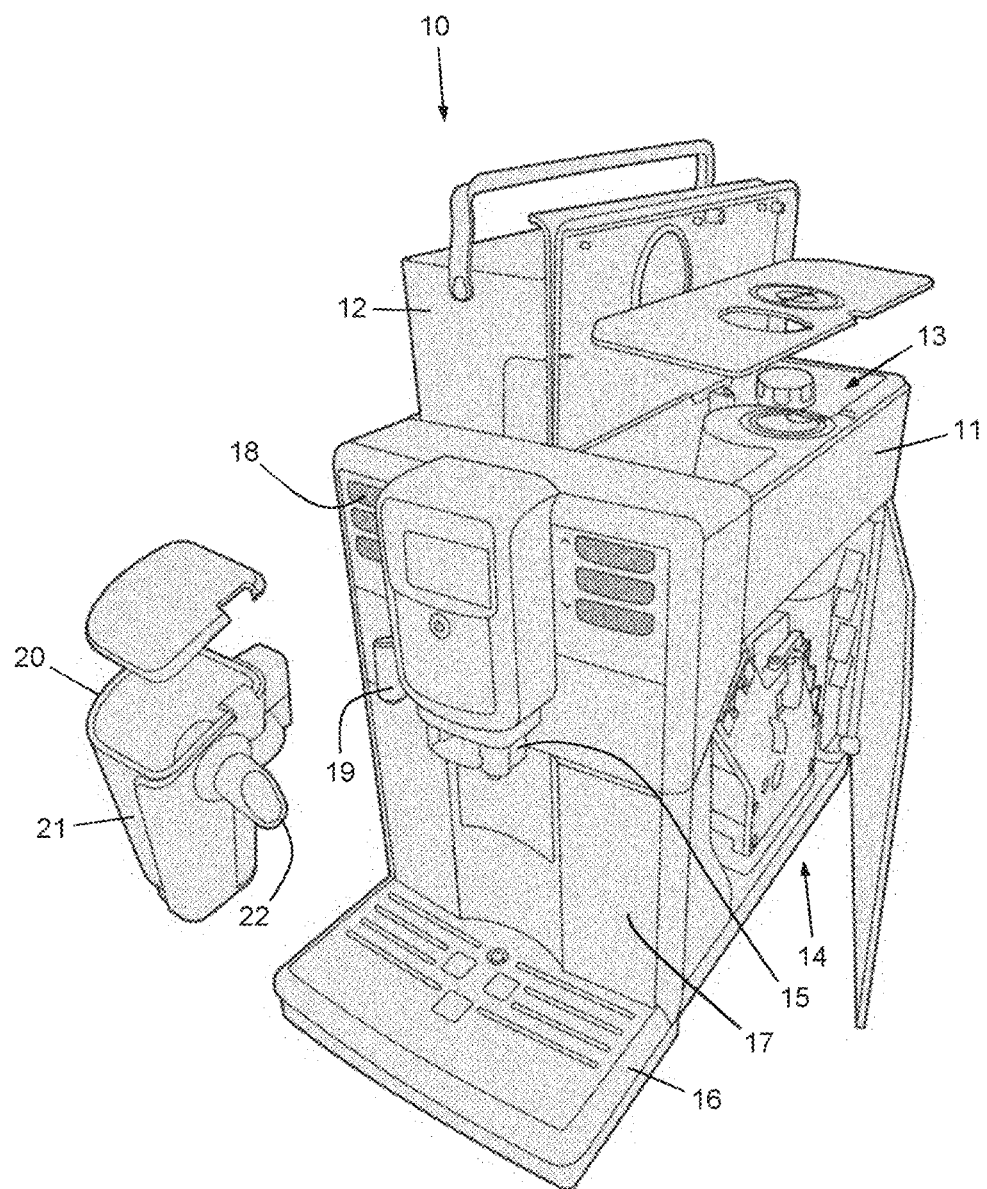
FIG. 1 diagrammatically shows a perspective view of a coffee machine according to an embodiment of the invention.

FIG. 1 shows a bean-to-cup espresso coffee machine 10 as a practical example of a beverage making device according to the invention. The coffee machine 10 is shown in a normal, operational orientation in FIG. 1, and where any reference having an orientation aspect is made in the present text, such reference is to be understood against the background of this normal, operational orientation.

The coffee machine 10 comprises a main body 11 having a space for accommodating a removably arranged water reservoir 12 and a space 13 for accommodating coffee beans. The coffee machine 10 further comprises an internal grinding mechanism for creating fresh coffee grinds as brewable matter, a brew chamber for receiving the coffee grinds, a pressurizing system for compressing the coffee grinds, a heater for heating water, and a pumping arrangement for pumping heated water through coffee grinds in the brew chamber. These components, which are not indicated in FIG. 1, are located in an internal space 14 of the main body 11. The pressurized system for compressing the coffee grinds may be a ground bean compressor comprising a piston that is movable in the brew chamber. The heater may comprise a thermoblock or a flow-through heater, for example.

The coffee machine 10 has a spout 15 for outputting a coffee drink. The spout 15 is arranged downstream of a beverage outlet of the brew chamber. Further, the spout 15 is located over a drip tray 16 that defines a water collecting area of the coffee machine 10. A waste bin 17 is provided for receiving used coffee grinds after a coffee brewing process has taken place. It is practical if the waste bin 17 is removable from the main body 11 in order to facilitate emptying and cleaning of the waste bin 17. The coffee machine 10 further has a user interface 18 for receiving user selections, such as for water selection and for other drinks selections. At least some of the other drinks selections may relate to drinks recipes which include frothed milk, including drinks recipes which include both coffee and frothed milk. The user interface 18 may also be functional to show relevant information to the user, in which case it may be practical if the user interface 18 comprises some type of screen.

Besides the spout 15 for outputting a coffee drink, the coffee machine 10 has a steam outlet 19 for outputting steam. The steam outlet 19 can also be used for delivering hot water, depending on the user selection at the user interface 18. The coffee machine 10 may comprise an additional heater for generating steam to be supplied at the steam outlet 19. Delivering steam is useful when it is required to heat and/or froth milk. It is possible that the coffee machine 10 includes a milk frothing unit 20 as shown in FIG. 1, which is separate from the main body 11, which is couplable to the steam outlet 19 and which comprises a milk container 21 and an outlet 22 for letting out frothed milk. Delivering hot water provides additional options to the user, such as making tea or instant soup. Hot water intended for emission at the steam outlet 19 follows another path from the heater 24 through the coffee machine 10 than hot water intended for use in a coffee brewing process, wherein the hot water does not pass the brew chamber.

Figure 2:
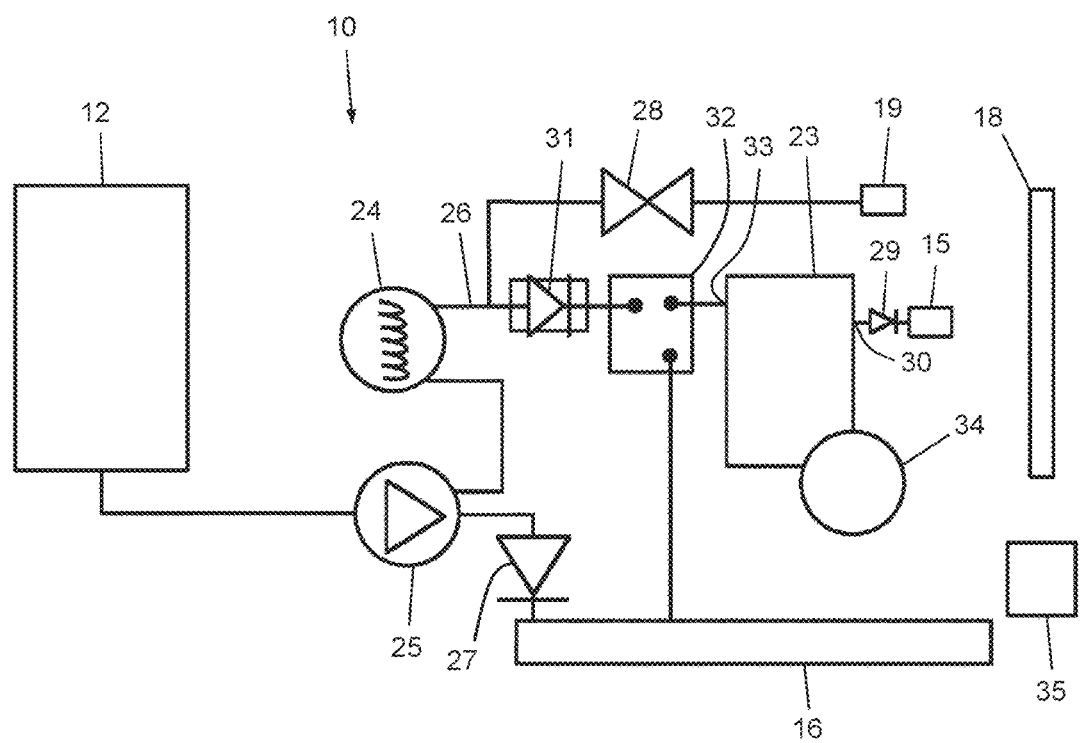
FIG. 2 shows an example of the hydraulic system of the coffee machine.

FIG. 2 shows a scheme of various components of the coffee machine 10, including the water reservoir 12, the spout 15, the drip tray 16, the user interface 18 and the steam outlet 19, and also the brew chamber 23, the heater 24, and the pumping arrangement 25 located in the internal space 14 of the main body 11. In FIG. 2, various conduits of a conduit system of the coffee machine 10 are indicated as continuous lines. The conduit system includes a main conduit arrangement 26 configured to enable transport of water from the heater 24 to the brew chamber 23, wherein the main conduit arrangement 26 may comprise a tube-like conduit or a system of tube-like conduits, for example. The coffee machine 10 further comprises various valves. In particular, the following valves are present in the coffee machine 10:

an overpressure valve 27 located between the pumping arrangement 25 and the drip tray 16,
an electronic valve 28 located between the heater 24 and the steam outlet 19,
an outlet valve 29 located at the beverage outlet 30 of the brew chamber 23,
a check valve 31 arranged in the main conduit arrangement 26, an inlet of the check valve 31 being coupled to the heater 24, and
an intermediate valve 32 arranged in the main conduit arrangement 26 as well, an outlet of the intermediate valve 32 being coupled to a water inlet 33 of the brew chamber 23.

The electronic valve 28 could be a single valve, but it is also possible that more than one valve is positioned between the heater 24 and the steam outlet 14 for realizing different variations of the circuit for delivering milk/hot water/steam. Further, it is also possible that the electronic valve 28 and/or the at least one additional valve are configured to enable a discharge of water to the drip tray 16.

The brew chamber 23 is movable between two positions by means of a motor 34, namely a position as illustrated in FIG. 2, which is a coffee brewing position at which the brew chamber 23 is coupled to the main conduit arrangement 26 through the intermediate valve 32 to thereby be capable of receiving hot water from the heater 24, and another position, which is a coffee grinds receiving position at which the brew chamber 23 is coupled to a combination of the space 13 for accommodating coffee beans and the internal grinding mechanism functioning as a matter supply area, to thereby be capable of receiving coffee grinds. In the coffee grinds receiving position, the brew chamber 23 is decoupled from the main conduit arrangement 26 and the intermediate valve 32 extends above the drip tray 16, wherein water as may be present in the brew chamber 23 is allowed to freely pass the water inlet 33 of the brew chamber 23 and the intermediate valve 32 and fall down to the drip tray 16 under the influence of gravity. In this way, any water residue water from a previous coffee brewing process may be discharged from the brew chamber 23, which is a contributing factor in achieving that only clean, fresh water is used in a new coffee brewing process. Further, when the brew chamber 23 is in the coffee grinds receiving position, an outlet of the check valve 31 extends above the drip tray 16 as well, wherein the check valve 31 is kept closed as long as the pressure at the inlet side thereof is below a pressure threshold, which may be in a range of 2 to 4 bar, for example.

The intermediate valve 32 is configured such that when the brew chamber 23 is moved from the coffee grinds receiving position to the coffee brewing position, the intermediate valve 32 causes interruption of a water path from the outlet of the check valve 31 to the drip tray 16 and establishment of a water path from the outlet of the check valve 31 to the brew chamber 23. The interruption of the water path from the outlet of the check valve 31 to the drip tray 16 can be realized in any suitable manner. For example, the intermediate valve 32 may comprise a sleeve-like component that is slid over the check valve 31 when the brew chamber 23 is moved from the coffee grinds receiving position to the coffee brewing position, to thereby form a physical bridge along which water can flow from the outlet of the check valve 31 towards the brew chamber 23.

The coffee machine 10 comprises a controller 35 that is configured to control operation of the coffee machine 10. To that end, the controller 35 is arranged and configured to communicate with various components of the coffee machine 10, including the internal grinding mechanism, the pressurizing system for compressing the coffee grinds, the heater 24, the pumping arrangement 25, the electronic valve 28 and the motor 34. Further, the controller 35 is configured to receive user input through the user interface 18 and take the input into account in determining respective operation parameters.

The controller 35 is configured to control the coffee machine 10 in such a way that when a user activates the coffee machine 10 and indicates that a coffee drink should be made, a preheating rinsing procedure is performed before the actual coffee brewing process is initiated. Generally speaking, the preheating rinsing procedure involves activating the heater 24 and activating the pumping arrangement 25 to displace water from the heater 24 to the brew chamber 23 in the coffee brewing position, through the main conduit arrangement 26 and the water inlet 33 of the brew chamber 23, for the purpose of rinsing the brew chamber 23 with hot water and thereby heat up the brew chamber 23. The coffee brewing process involves activating the internal grinding mechanism to grind an amount of coffee beans, supplying the coffee grinds to the brew chamber 23 in the coffee grinds receiving position, activating the motor 34 to move the brew chamber 23 from the coffee grinds receiving position to the coffee brewing position, activating the pumping arrangement 25 to displace water from the heater 24 in the active state to the brew chamber 23, and also to increase the pressure prevailing in the brew chamber 24 to such a level that the outlet valve 29 opens and the freshly brewed coffee drink is discharged from the brew chamber 24 through the beverage outlet 30 and dispensed from the spout 15, and activating the motor 34 once more to move the brew chamber 23 from the coffee brewing position to the coffee grinds receiving position as a rest position. The outlet valve 29 may be configured so as to open at a pressure of about 6 bar, for example.

The controller 35 is configured to first apply an algorithm designed to make the coffee machine 10 perform the preheating rinsing procedure and to subsequently apply an algorithm designed to make the coffee machine 10 perform the coffee brewing process. The algorithm of the preheating rinsing procedure involves steps to operate the heater 24 to heat water and to realize a supply of hot water from the heater 24 to the brew chamber 23 through the main conduit arrangement 26 and the water inlet 33 of the brew chamber 23. Advantageously, the algorithm also involves steps to first realize a discharge of water from the main conduit arrangement 26 to the drip tray 16, whereby it is achieved that the main conduit arrangement 26 is emptied of cold water first, which is beneficial to preheating efficiency so that the preheating rinsing procedure can be performed in a short time and with a limited amount of water. The algorithm may particularly involve steps of activating the pumping arrangement 25 while the brew chamber 23 is in the coffee grinds receiving position (rest position), so that cold water is discharged from the main conduit arrangement 26 to the drip tray 16, through the check valve 31, shutting off the pumping arrangement 25 to stop the discharge to the drip tray 16, activating the motor 34 to move the brew chamber 23 from the coffee grinds receiving position to the coffee brewing position, activating the heater 24, and activating the pumping arrangement 25 to realize a supply of hot water from the heater 24 to the brew chamber 23, through the main conduit arrangement 26 and the water inlet 33 of the brew chamber 23. It is this supply of hot water that is used to actually rinse the brew chamber 23, and the water involved is also referred to as rinsing water.

It is advantageous if the rinsing water is allowed to stay inside the brew chamber 23 before being discharged from the brew chamber 23, so that there is sufficient time for heat transfer from the water to the brew chamber walls. Further, according to the invention, the discharge of the rinsing water is to take place at another position on the brew chamber 23 than the position of the beverage outlet 30. In view thereof, the pumping arrangement 25 is controlled such that the pressure in the brew chamber 23 remains well below the level needed for opening the outlet valve 29, and the algorithm of the preheating rinsing procedure may further comprise steps of shutting off the pumping arrangement 25 after a suitable volume of rinsing water has reached the brew chamber 23, and activating the motor 34 to move the brew chamber 23 from the coffee brewing position to the coffee grinds receiving position after a waiting period. A duration of the waiting period may be in a range of 2 to 20 seconds, for example. As explained earlier, in the coffee grinds receiving position, the brew chamber 23 is decoupled from the main conduit arrangement 26 and the intermediate valve 32 extends above the drip tray 16, wherein water as may be present in the brew chamber 23 is allowed to freely pass the water inlet 33 of the brew chamber 23 and the intermediate valve 32 and fall down to the drip tray 16 under the influence of gravity. Thus, by keeping the pressure in the brew chamber 23 low enough to avoid opening of the outlet valve 29 during the rinsing procedure, and by moving the brew chamber 23 from the coffee brewing position to the coffee grinds receiving position at a certain point near the end of the rinsing procedure, it is achieved that the rinsing water is contained in the brew chamber 23 until that point and then discharged from the brew chamber 23 through the water inlet 33. As a result, the beverage outlet 30 can be exclusively used for discharging coffee drinks from the brew chamber 23, so that the coffee machine 10 only dispenses coffee drinks from the spout 15. The rinsing water reaches the drip tray 16 via another route than through the spout 15, wherein it cannot happen that the rinsing water ends up in a receptacle positioned to receive a coffee drink from the spout 15. With the brew chamber 23 at the coffee grinds receiving position, the coffee brewing process can start directly after the preheating rinsing procedure has ended.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

Various options which are known to be applicable to beverage making devices are applicable in the context of the invention as well. In this respect, it is noted that in the beverage making device 10 according to the invention, the water reservoir 12 may be either internal or external, or may be plumbed in, a sensor in communication with the controller 35 may be provided for the purpose of monitoring the level of liquid in the drip tray 16, a sensor in communication with the controller 35 may be provided for the purpose of monitoring the level of matter in the waste bin 17, one or more sensors in communication with the controller 35 may be provided for detecting removal of the water reservoir 12, the drip tray 16 and/or the waste bin 17 from the main body 11, etc. Also, it is possible that the beverage making device 10 comes with a connected device for remote control of the beverage making device 10, wherein the controller 35 is configured to receive remote signals. In respect of the optional bean grinding functionality of the beverage making device 10, it is noted that the controller 35 may be configured to allow a user to overrule this functionality or to deliberately activate this functionality.

The water collecting area to which the rinsing water can be discharged may be an area that is especially provided for the purpose of receiving the rinsing water, but it is more practical if use is made of a water collecting area that is already provided in the design of the beverage making device 10, such as the area defined by the drip tray 16, as is the case in the above-described examples, or the area defined by the water reservoir 12. As will be apparent to the person skilled in the art, the above-mentioned fact that the main conduit arrangement 26 may comprise a tube-like conduit or a system of tube-like conduits, for example, is a general fact of the invention and not linked to any of the particular aspects of the examples addressed in the foregoing. The same is applicable to the above-mentioned fact that the heater 24 may comprise a thermoblock or a flow-through heater, for example.

As suggested in the foregoing, a bean-to-cup espresso coffee machine is just one out of many feasible examples of the beverage making device 10 according to the invention. The beverage making device 10 according to the invention does not necessarily need to be equipped with a mechanism for storing coffee beans and grinding coffee beans so that fresh coffee grinds can be supplied to the brew chamber 23 when the beverage making device 10 is operated to make a coffee drink. As an alternative, it is possible that the beverage making device 10 is configured to receive pre-ground coffee or to make use of capsules, pods or the like.

The hydraulic system of the beverage making device 10 according to the invention may be of any suitable layout, as long as it is possible to realize a discharge of rinsing water from the beverage chamber 23 at another position on the beverage chamber 23 than the position of the beverage outlet 30 in some way. The beverage outlet 30 may comprise one or more openings in a brew chamber wall, for example. Similarly, the water inlet 33 may comprise one or more openings in a brew chamber wall.

Notable aspects of the invention are summarized as follows. In the field of beverage making devices 10 comprising a brew chamber 23, a rinsing procedure may be applied to a beverage making device 10 for the purpose of rinsing the brew chamber 23 with water prior to or after a beverage brewing process. Measures are taken to achieve that a discharge of rinsing water from the brew chamber 23 takes place at another position on the brew chamber 23 than the position of a beverage outlet 30 of the brew chamber 23, particularly at a position which is an upstream position on the brew chamber 23 as seen in a normal direction of water and brewed beverage through the beverage making device 10, i.e. a direction of water and brewed beverage associated with the beverage brewing process. This can be done on the basis of appropriate control of operation of the beverage making device 10 during the rinsing procedure. It is not necessary to have a separate outlet on the brew chamber 23 for the rinsing water, as use may be made of a water inlet 33 of the brew chamber 23 for the purpose of discharging the rinsing water from the brew chamber 23, for example.

Methods covered by the following definitions are also included in the present disclosure:

a method of operating a beverage making device 10 comprising a brew chamber 23 configured to enable a beverage brewing process, wherein the brew chamber 23 has a beverage outlet 30 configured to let out a brewed beverage at the end of the beverage brewing process, wherein the method comprises performing a rinsing procedure in which the brew chamber 23 is rinsed with water prior to or after the beverage brewing process, and wherein, during the rinsing procedure, a supply of rinsing water to the brew chamber 23 is realized and at a later stage a discharge of rinsing water from the brew chamber 23 is realized at another position on the brew chamber 23 than the position of the beverage outlet 30, wherein the brew chamber 23 has a water inlet 33 configured to receive water and let in water to an interior of the brew chamber 23, and wherein the position on the brew chamber 23 at which rinsing water is discharged from the brew chamber 23 at the later stage of the rinsing procedure is a position of the water inlet 33 on the brew chamber 23, a method of operating a beverage making device 10 comprising a brew chamber 23 configured to enable a beverage brewing process, wherein the brew chamber 23 has a beverage outlet 30 configured to let out a brewed beverage at the end of the beverage brewing process, wherein the method comprises performing a rinsing procedure in which the brew chamber 23 is rinsed with water prior to or after the beverage brewing process, and wherein, during the rinsing procedure, a supply of rinsing water to the brew chamber 23 is realized and at a later stage a discharge of rinsing water from the brew chamber 23 is realized at another position on the brew chamber 23 than the position of the beverage outlet 30, wherein the beverage making device 10 further comprises a pumping arrangement 25 configured to subject water in the beverage making device 10 to a pumping action towards the brew chamber 23 and to increase fluid pressure in the brew chamber 23, and also comprises a normally-closed outlet valve 29 at the position of the beverage outlet 30 of the brew chamber 23, and wherein, throughout the rinsing procedure, the pumping arrangement 25 is operated to keep fluid pressure in the brew chamber 23 below a level at which the outlet valve 29 opens, a method of operating a beverage making device 10 comprising a brew chamber 23 configured to enable a beverage brewing process, wherein the brew chamber 23 has a beverage outlet 30 configured to let out a brewed beverage at the end of the beverage brewing process, wherein the method comprises performing a rinsing procedure in which the brew chamber 23 is rinsed with water prior to or after the beverage brewing process, and wherein, during the rinsing procedure, a supply of rinsing water to the brew chamber 23 is realized and at a later stage a discharge of rinsing water from the brew chamber 23 is realized at another position on the brew chamber 23 than the position of the beverage outlet 30, wherein the beverage making device 10 further comprises a water collecting area 16 outside of the brew chamber 23 that is arranged and configured to receive all of the water from the beverage making device 10 other than the water that ends up in the beverages which are made by means of the beverage making device 10, and wherein the position on the brew chamber 23 at which rinsing water is discharged from the brew chamber 23 at the later stage of the rinsing procedure is a position from which the rinsing water is allowed to reach the water collecting area 16, and a method of operating a beverage making device 10 comprising a brew chamber 23 configured to enable a beverage brewing process, wherein the brew chamber 23 has a beverage outlet 30 configured to let out a brewed beverage at the end of the beverage brewing process, wherein the method comprises performing a rinsing procedure in which the brew chamber 23 is rinsed with water prior to or after the beverage brewing process, and wherein, during the rinsing procedure, a supply of rinsing water to the brew chamber 23 is realized and at a later stage a discharge of rinsing water from the brew chamber 23 is realized at another position on the brew chamber 23 than the position of the beverage outlet 30, wherein the beverage making device 10 further comprises a heater 24 configured to heat water, and a main conduit arrangement 26 configured to enable transport of water from the heater 24 to the brew chamber 23, wherein the brew chamber 23 is couplable to and decouplable from the main conduit arrangement 26, and wherein, during the rinsing procedure, the brew chamber 23 is coupled to the main conduit arrangement 26 for receiving the supply of rinsing water from the main conduit arrangement 26 and is at the later stage decoupled from the main conduit arrangement 26 for discharging the rinsing water, wherein optionally the brew chamber 23 is movably arranged in the beverage making device 10, and wherein, during the rinsing procedure, a position of the brew chamber 23 is changed from a position at which the brew chamber 23 is coupled to the main conduit arrangement 26 to a position at which the brew chamber 23 is decoupled from the main conduit arrangement 26 and/or during the rinsing procedure as performed prior to the beverage brewing process, an action of discharging water from the main conduit arrangement 26 without supplying the water to the brew chamber 23 is performed prior to the action of realizing the supply of rinsing water to the brew chamber 23.

Similarly, beverage making devices 10 covered by the following definitions are also included in the present disclosure:

- a beverage making device 10 comprising a brew chamber 23 configured to enable a beverage brewing process, wherein the brew chamber 23 has a beverage outlet 30 configured to let out a brewed beverage at the end of the beverage brewing process, and a controller 35 configured to control operation of the beverage making device 10, wherein the controller 35 is configured to apply an algorithm designed to make the beverage making device 10 perform a rinsing procedure in which the brew chamber 23 is rinsed with water prior to or after the beverage brewing process, and wherein the algorithm includes steps to realize a supply of rinsing water to the brew chamber 23 and to realize at a later stage a discharge of rinsing water from the brew chamber 23 at another position on the brew chamber 23 than the position of the beverage outlet 30, wherein the brew chamber 23 has a water inlet 33 configured to receive water and let in water to an interior of the brew chamber 23, and wherein the other position on the brew chamber 23 than the position of the beverage outlet 33 is a position of the water inlet 33 on the brew chamber 23,
- a beverage making device 10 comprising a brew chamber 23 configured to enable a beverage brewing process, wherein the brew chamber 23 has a beverage outlet 30 configured to let out a brewed beverage at the end of the beverage brewing process, and a controller 35 configured to control operation of the beverage making device 10, wherein the controller 35 is configured to apply an algorithm designed to make the beverage making device 10 perform a rinsing procedure in which the brew chamber 23 is rinsed with water prior to or after the beverage brewing process, and wherein the algorithm includes steps to realize a supply of rinsing water to the brew chamber 23 and to realize at a later stage a discharge of rinsing water from the brew chamber 23 at another position on the brew chamber 23 than the position of the beverage outlet 30, the beverage making device 10 further comprising a pumping arrangement 25 configured to subject water in the beverage making device 10 to a pumping action towards the brew chamber 23 and to increase fluid pressure in the brew chamber 23, and also comprising a normally-closed outlet valve 29 at the position of the beverage outlet 30 of the brew chamber 23, wherein the algorithm is designed to operate the pumping arrangement 25 to keep fluid pressure in the brew chamber 23 below a level at which the outlet valve 29 opens throughout the rinsing procedure,
- a beverage making device 10 comprising a brew chamber 23 configured to enable a beverage brewing process, wherein the brew chamber 23 has a beverage outlet 30 configured to let out a brewed beverage at the end of the beverage brewing process, and a controller 35 configured to control operation of the beverage making device 10, wherein the controller 35 is configured to apply an algorithm designed to make the beverage making device 10 perform a rinsing procedure in which the brew chamber 23 is rinsed with water prior to or after the beverage brewing process, and wherein the algorithm includes steps to realize a supply of rinsing water to the brew chamber 23 and to realize at a later stage a discharge of rinsing water from the brew chamber 23 at another position on the brew chamber 23 than the position of the beverage outlet 30, the beverage making device 10 further comprising a water collecting area 16 outside of the brew chamber 23 that is arranged and configured to receive all of the water from the beverage making device 10 other than the water that ends up in the beverages which are made by means of the beverage making device 10, and wherein the position on the brew chamber 23 at which rinsing water is discharged from the brew chamber 23 at the later stage of the rinsing procedure is a position from which the rinsing water is allowed to reach the water collecting area 16, and
- a beverage making device 10 comprising a brew chamber 23 configured to enable a beverage brewing process, wherein the brew chamber 23 has a beverage outlet 30 configured to let out a brewed beverage at the end of the beverage brewing process, and a controller 35 configured to control operation of the beverage making device 10, wherein the controller 35 is configured to apply an algorithm designed to make the beverage making device 10 perform a rinsing procedure in which the brew chamber 23 is rinsed with water prior to or after the beverage brewing process, and wherein the algorithm includes steps to realize a supply of rinsing water to the brew chamber 23 and to realize at a later stage a discharge of rinsing water from the brew chamber 23 at another position on the brew chamber 23 than the position of the beverage outlet 30, the beverage making device 10 further comprising a heater 24 configured to heat water, and a main conduit arrangement 26 configured to enable transport of water from the heater 24 to the brew chamber 23, wherein the brew chamber 23 is couplable to and decouplable from the main conduit arrangement 26, and wherein, during the rinsing procedure, the brew chamber 23 is coupled to the main conduit arrangement 26 for receiving the supply of rinsing water from the main conduit arrangement 26 and is at the later stage decoupled from the main conduit arrangement 26 for discharging the rinsing water, wherein optionally the brew chamber 23 is movable in the beverage making device 10 between a position at which the brew chamber 23 is decoupled from the main conduit arrangement 26 and a position at which the brew chamber 23 is coupled to the main conduit arrangement 26, and wherein the steps of the algorithm involve changing a position of the brew chamber 23 from a position at which the brew chamber 23 is coupled to the main conduit arrangement 26 to a position at which the brew chamber 23 is decoupled from the main conduit arrangement 26 and/or the algorithm further includes steps to realize a discharge of water from the main conduit arrangement 26 without supplying the water to the brew chamber 23 prior to the supply of rinsing water to the brew chamber 23 if the rinsing procedure is to be performed prior to the beverage brewing process.

The invention claimed is:

1. A method for operating a beverage making device, comprising:
performing a rinsing procedure in which a brew chamber of the beverage making device is rinsed with water prior to or after a beverage brewing process, wherein, during the rinsing procedure, a supply of rinsing water to the brew chamber is realized and at a later stage of the rinsing procedure a discharge of rinsing water from the brew chamber is realized at an other position on the brew chamber than a position of a beverage outlet of the brew chamber, which the other position on the brew chamber than the position of the beverage outlet is an upstream position on the brew chamber as seen in a direction of water and brewed beverage through the beverage making device associated with the beverage brewing process, wherein the other position is a position on the brew chamber at which the supply of the rinsing water to the brew chamber is realized.

2. The method of claim 1, further comprising receiving, at a water inlet, water and letting in the water to an interior of the brew chamber, and wherein the other position on the brew chamber at which the rinsing water is discharged from the brew chamber at the later stage of the rinsing procedure is a position of the water inlet on the brew chamber.

3. The method of claim 1, further comprising subjecting water in the beverage making device to a pumping action towards the brew chamber by a pumping arrangement of the beverage making device, and increasing fluid pressure in the brew chamber, wherein the beverage making device further comprises a normally-closed outlet valve at the position of the beverage outlet of the brew chamber, and wherein, throughout the rinsing procedure, the pumping arrangement is operated to keep the fluid pressure in the brew chamber below a level at which the outlet valve opens.

4. The method of claim 1, further comprising receiving, in a water collecting area outside of the brew chamber, all of the water from the beverage making device other than the water that ends up in the beverages which are made by the beverage making device, and wherein the other position on the brew chamber at which rinsing water is discharged from the brew chamber at the later stage of the rinsing procedure is a position from which the rinsing water is allowed to reach the water collecting area.

5. The method of claim 1, further comprising:
heating, by a heater, water; and
enabling, by a main conduit arrangement, a transport of water from the heater to the brew chamber, wherein the brew chamber is couplable to and decouplable from the main conduit arrangement, and wherein, during the rinsing procedure, the brew chamber is coupled to the main conduit arrangement for receiving the supply of rinsing water from the main conduit arrangement and is at the later stage decoupled from the main conduit arrangement for discharging the rinsing water.

6. The method of claim 5, wherein the brew chamber is movably arranged in the beverage making device, and wherein, during the rinsing procedure, a position of the brew chamber is changed from a position at which the brew chamber is coupled to the main conduit arrangement to a position at which the brew chamber is decoupled from the main conduit arrangement.

7. The method of claim 5, wherein, during the rinsing procedure as performed prior to the beverage brewing process, an action of discharging water from the main conduit arrangement without supplying the water to the brew chamber is performed prior to an action of realizing the supply of rinsing water to the brew chamber.

8. A method for operating a beverage making device, comprising:
performing a rinsing procedure in which a brew chamber is rinsed with water prior to or after a beverage brewing process, wherein, during the rinsing procedure, a supply of rinsing water to the brew chamber is realized and at a later stage a discharge of rinsing water from the brew chamber at another position on the brew chamber than a position of a beverage outlet is realized, wherein the brew chamber has a water inlet configured to receive water and let in water to an interior of the brew chamber, and wherein the another position on the brew chamber at which rinsing water is discharged from the brew chamber at the later stage of the rinsing procedure is a position of the water inlet on the brew chamber.

9. A method for operating a beverage making device, comprising:
performing a rinsing procedure in which a brew chamber is rinsed with water prior to or after a beverage brewing process, wherein, during the rinsing procedure, a supply of rinsing water to the brew chamber is realized and at a later stage a discharge of rinsing water from the brew chamber at another position on the brew chamber than a position of a beverage outlet is realized; and
subjecting the water in the beverage making device to a pumping action by a pumping arrangement towards the brew chamber and for increasing fluid pressure in the brew chamber, wherein, throughout the rinsing procedure, the pumping arrangement is operated to keep fluid pressure in the brew chamber below a level at which an outlet valve opens, wherein the outlet valve is normally-closed at the position of the beverage outlet of the brew chamber.

10. A method for operating a beverage making device, comprising:
performing a rinsing procedure in which a brew chamber is rinsed with water prior to or after a beverage brewing process, wherein, during the rinsing procedure, a supply of rinsing water to the brew chamber is realized and at a later stage a discharge of rinsing water from the brew chamber at another position on the brew chamber than a position of a beverage outlet is realized; and transporting hot water from a heater to the brew chamber via a main conduit arrangement, wherein the brew chamber is couplable to and decouplable from the main conduit arrangement, and wherein, during the rinsing procedure, the brew chamber is coupled to the main conduit arrangement for receiving the supply of rinsing water from the main conduit arrangement and is at the later stage decoupled from the main conduit arrangement for discharging the rinsing water.

* * * * *